F. E. SCHARTOW.
NONSKID DEVICE.
APPLICATION FILED OCT. 13, 1920.
1,409,975.
Patented Mar. 21, 1922.
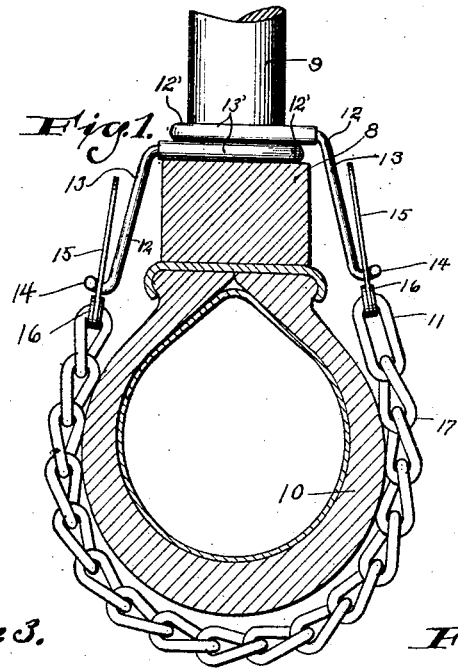
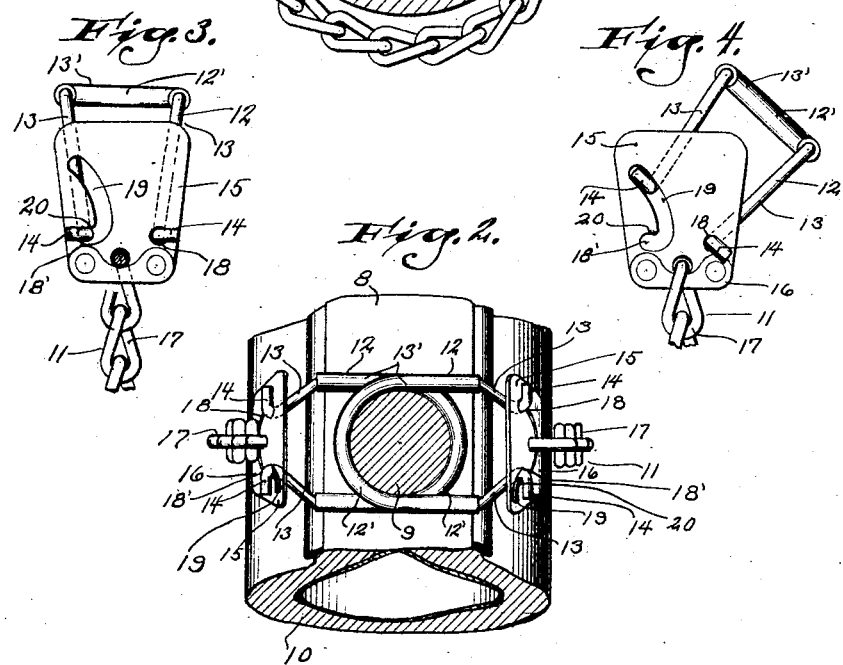
Inventor
Frank E. Schartow.
By Morsell & Keeney
Attorneys.

UNITED STATES PATENT OFFICE.

FRANK E. SCHARTOW, OF SOUTH MILWAUKEE, WISCONSIN, ASSIGNOR TO THE MIDLAND COMPANY, OF SOUTH MILWAUKEE, WISCONSIN, A CORPORATION OF WISCONSIN.

NONSKID DEVICE.

1,409,975.

Specification of Letters Patent. Patented Mar. 21, 1922.

Application filed October 13, 1920. Serial No. 416,647.

*To all whom it may concern:*

Be it known that I, FRANK E. SCHARTOW, a citizen of the United States, and resident of South Milwaukee, in the county of Milwaukee and State of Wisconsin, have invented new and useful Improvements in Nonskid Devices, of which the following is a description, reference being had to the accompanying drawings, which are a part of this specification.

This invention relates to improvements in non skid devices, more particularly adapted for use with automobile wheels.

In the use of power driven vehicles, the traction wheels sometimes get into damp deep ruts or road ditches with the result that in attempting to get out, one or both traction wheels will spin around without advancing the vehicle. Under these conditions it would be quite difficult and impractical to attach non skid devices which extend circumferentially around the tires.

It is one of the objects of the present invention to overcome the above mentioned objectionable features and provide a non skid device which may be easily mounted on or removed from a wheel with the minimum effort and which will, when mounted, eliminate the spinning of the wheels and provide sufficient traction to enable the vehicle to pull itself out of the rut or ditch by its own power.

A further object of the invention is to provide a non skid device having novel means for connecting the transverse chains to the wheel engaging members whereby the parts may be easily and quickly attached and detached.

A further object of the invention is to provide a non skid device formed in part of spring wire engageable around a spoke of the wheel and connectable to the transverse chain by a novel connector.

A further object of the invention is to provide a non skid device which is of simple construction, is strong and durable and is well adapted for the purpose described.

With the above and other objects in view, the invention consists of the improved non skid device and its parts and combinations as set forth in the claims, and all equivalents thereof.

In the accompanying drawing in which the same reference characters indicate the same parts in all of the views:

Fig. 1 is a transverse sectional view of a portion of an automobile wheel and tire having the improved non skid device mounted thereon;

Fig. 2 is a view from the inside of the felly of the parts shown in Fig. 1;

Fig. 3 is a side detail view of the connecting portion of the device shown in closed position; and Fig. 4 is a similar view of the connecting portion shown in open position.

Referring to the drawing, the numeral 8 indicates the rim or felly, 9 the spoke and 10 the tire of an ordinary automobile wheel on which the improved non skid device 11 is adapted to be used. Said non skid device comprises two complementary attaching members 12 formed of spring steel wire bent into U-shape loops 12' to engage and extend around the opposite sides of any one of the spokes 9 and have their outer stem portions directed radially slight outwardly to form side portions 13 which extend on opposite sides of the felly or rim 8. The end parts of the portions 13 of each member 12 are bent outwardly and then at right angles away from each other to form hooks 14 which extend through and engage connecting terminal members 15. Said terminal members 15 are formed of flat plates having reinforced outer edge portions 16 to provide sufficient strength to connect the transverse tread or traction chains 17 thereto.

One of the hook portions 14 of each member 12 extends pivotally and removably through an opening 18 formed in its terminal member 15, and the other hook portion 14 of each member extends through a similar opening 18' in its respective terminal member 15 and securely holds the parts together.

The looped or rounded portion 12' of the attaching members are covered with rubber tubing 13' to prevent injury to the wheel spoke around which it extends.

In order to permit the easy separation of the device from the wheel, the terminal members are each provided with a curved opening 19 which connects in offset relation at one end with the openings 18' to form locking shoulders 20. These shoulders will hold the parts in locked position as shown in Fig. 3 and when it is desired to remove the chains, it is only necessary to spring the hook parts which extend through the curved slots towards the other hooks until they disengage the shoulders and then swing the terminal members or the attaching members 12 to the position shown in Fig. 4 and then outwardly through the curved slots and said members may then be unhooked from the other hooked parts and the device removed from the wheel. In attaching the device it is only necessary to surround the spoke and the rim with the parts and when partly connected, the terminal members 15 are connected in the manner shown in Fig. 4 and the members are then swung edgewise to cause the hook portions 14 to snap over the shoulders 20 and into the recesses 18'.

The non skid devices are light in weight and when removed from the wheels may be stored in a very small space.

From the foregoing description it will be seen that the non skid device is of very simple construction and may be very quickly placed in position or removed from the wheels.

What I claim as my invention is:

1. A non skid device, comprising U-shaped complementary attaching members extending in opposite directions, a pair of like terminal members removably connected thereto by a swinging movement, and a traction chain connected at its opposite ends to the terminal members.

2. A non skid device, comprising U-shaped complementary attaching members extending in opposite directions having hooked end portions, a pair of like terminal members having openings through which the hooked end portions removably extend, and a traction chain connected at one end to one of the terminal members and at its opposite end to the other terminal member.

3. A non skid device, comprising U-shaped complementary attaching members formed of spring material and having hooked end portions, terminal members having openings through which the hooked end portions removably extend, one of said openings in each terminal member being of elongated form and offset to form locking shoulders, and a traction chain connected at its opposite ends to the terminal members.

4. A non skid device, comprising U-shaped complementary attaching members formed of spring metal and having angled portions provided with hooked ends which extend away from each other, flat terminal members having rounded openings through which one of the hooked end portions of the attaching members extends, said terminal members also having curved openings having angled portions forming shoulders through which the other of said hooked ends extend to form a locking engagement therewith, said terminal members also having other openings, and a traction chain having its opposite end portions extending through the last mentioned openings.

In testimony whereof, I affix my signature.

FRANK E. SCHARTOW.